(12) United States Patent
Peebles

(10) Patent No.: US 6,527,229 B1
(45) Date of Patent: Mar. 4, 2003

(54) AERODYNAMIC LIFT GENERATING DEVICE

(75) Inventor: Patrick Peebles, Rome (IT)

(73) Assignee: Fanwing Limited (GB)

( * ) Notice: Subject to any disclaimer, the term of this patent is extended or adjusted under 35 U.S.C. 154(b) by 0 days.

(21) Appl. No.: 09/498,823

(22) Filed: Feb. 4, 2000

(51) Int. Cl.$^7$ .............................................. B64C 23/06
(52) U.S. Cl. ........................... 244/199; 244/9; 244/10; 244/19; 244/21
(58) Field of Search ........................... 244/199, 21, 19, 244/9, 10; 416/178

(56) References Cited

U.S. PATENT DOCUMENTS

| 882,189 | A | * | 3/1908 | Drake |
| 1,613,834 | A | * | 1/1927 | Jordanoff |
| 1,714,609 | A | * | 5/1929 | Massey |
| 2,050,903 | A | * | 8/1936 | Topliff |
| 2,183,186 | A | * | 12/1939 | Dall'Asta |
| 2,334,286 | A | * | 11/1943 | Quickel |
| 2,344,515 | A | * | 3/1944 | Massey |
| 5,954,295 | A | * | 9/1999 | Olson |

FOREIGN PATENT DOCUMENTS

FR 616551 * 10/1925 .................. 244/10

* cited by examiner

Primary Examiner—Peter M. Poon
Assistant Examiner—Tien Dinh
(74) Attorney, Agent, or Firm—McNair Law Firm, P.A.

(57) ABSTRACT

An aircraft has its wing defined as a wing-like body with a tangential flow rotor in the leading edge. A shroud, under the lower part of the tangential flow rotor, terminates in at least one movable flap defining a lift-generating lip when the rotor is rotating such that the upper part of the rotor, projecting above the level of the upper surface of the wing-like body, is moving rearwardly. Differential adjustment of the flaps in the wings to either side of an aircraft centerline allows directional control and control of banking of the aircraft.

8 Claims, 4 Drawing Sheets

AERODYNAMIC LIFT GENERATING DEVICE

BACKGROUND OF THE INVENTION

The present invention relates to an aerodynamic lift generating device and is an improvement in the lift generating member disclosed and claimed in WO-A-98/07622.

The device of the above-mentioned International application uses a cross-flow or tangential flow rotor positioned in place of the leading edge of a wing-like body and rotating such that the part of the fan rotor at the top of the wing-like body is moving rearwardly, i.e. towards the trailing edge of the wing-like body, whereas the lower part is moving forwardly. The forwardly moving lower part is shrouded and in various of the embodiments of that earlier device the shroud terminates in a lip which helps to form and locate a vortex within the rotor when the rotor is in motion.

Lift control, and hence steering and differential lift generation, in that earlier device was envisaged as being effected by a differential gearbox to drive the parts of the rotor to either side of an aircraft centerline at different rotational speeds so as to generate different lift and thrust values to each side of the centerline.

OBJECT OF THE INVENTION

It is an object of the present invention to provide an alternative means of generating differential lift in such a vehicle.

SUMMARY OF THE INVENTION

The present invention envisages using a movable flap as the lip at the leading edge of the shroud defining the undersurface of the wing-like body, so that the lip can be either (i) eliminated by positioning the flap flush with the adjacent part of the shroud or (ii) reduced in its degree of intrusion on the space occupied by the rotor by causing it to adopt a position between the optimum vortex-generating configuration and the fully flush position.

Thus according to a first aspect of the present invention there is provided a lift-generating member comprising:—a wing-like body defining leading and trailing edges and opposed surfaces which converge towards said trailing edge; and a spanwise extending tangential flow rotor positioned adjacent the leading edge of the wing-like body and projecting proud of that one of the opposed surfaces which is uppermost in use of the lift-generating member, whereas the other opposed surface which is the lower one in use of the lift-generating member is defined in part by a shroud which extends forwardly and upwardly and confines the space occupied by the tangential flow rotor and terminates at a lip to define a vortex within the rotor; characterised in that the lip is defined by at least one movable flap which is variable between a first position projecting away from the general direction of the shroud so as to intrude on the space occupied by the rotor and a second position in which it does not intrude to that same extent.

By positioning the flaps to either side of the aircraft centerline in configurations which differ from one another it is possible for the lift at the side where the flap is "less intrusive" to be reduced as compared with that where it is "more intrusive". Because the vortex influences both lift and thrust it is also conceivable to use the differential lift effect to generate also a yawing movement, preferably such that the difference in lift between the two sides of the aircraft centerline and the difference in thrust on the two sides of the aircraft centerline cause the aircraft to execute a slipless banked turn.

The control of the angle of the flaps on both wings simultaneously also enables the lift to be rapidly increased or decreased for manoeuvring, either to effect take off and landing or to manoeuver the aircraft in flight.

It is also possible for the vortex-generating "lip" to be defined by several different flaps at different regions along the span of the wing, so that the turning effect and/or the banking effect can be more finely tuned by selecting for the lift variations a portion of the flap which is at a greater or lesser distance from the aircraft centerline, thereby changing the moment of the differential lift and thrust forces.

BRIEF DESCRIPTION OF THE DRAWINGS

In order the present invention may more readily be understood the following description is given, merely by way of example, with reference to the accompanying drawings in which.

DETAILED DESCRIPTION OF THE INVENTION

Figure 1:
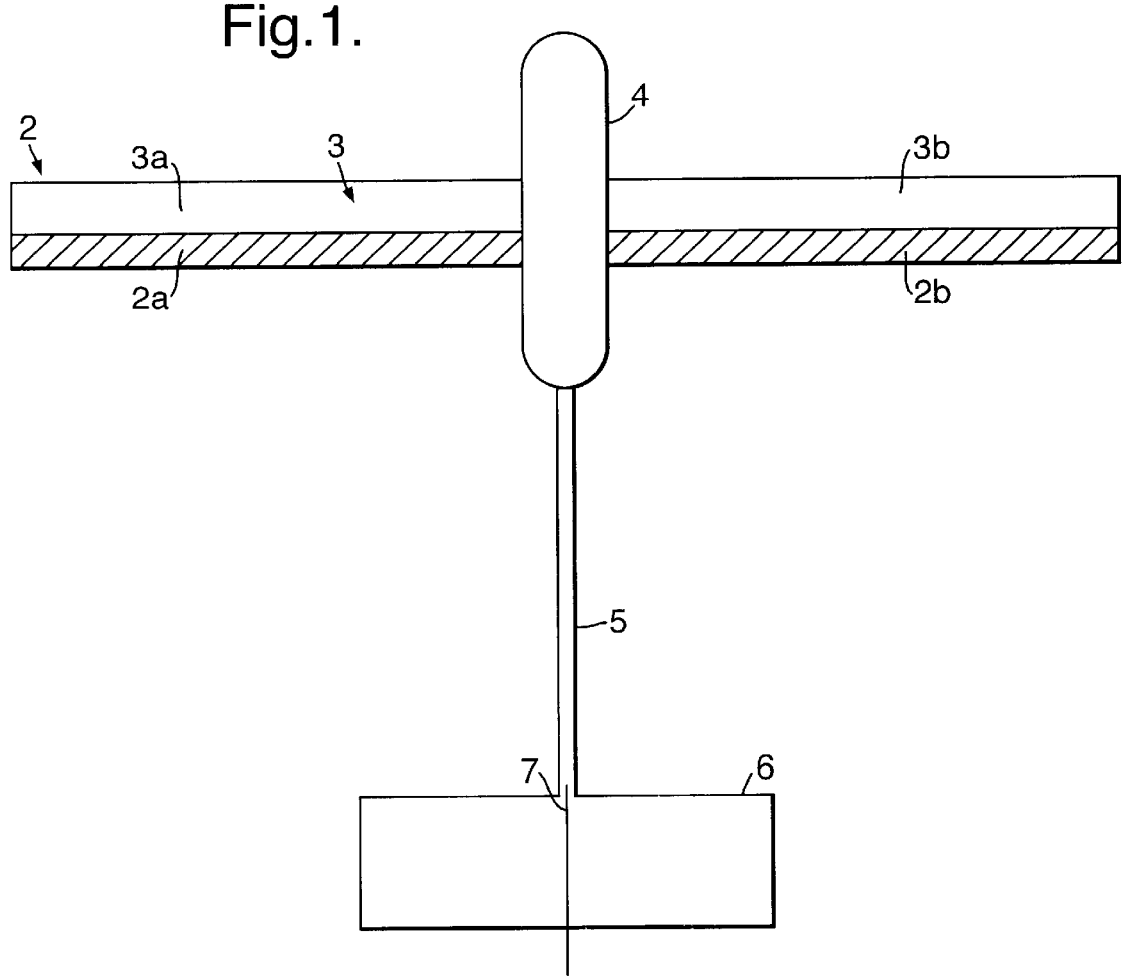
FIG. 1 is a top plan view, in schematic form, of an aircraft embodying the present invention.

FIG. 1 is a schematic plan view of an aircraft 1 comprising a wing body 2 divided into a port wing body 2a and starboard wing body 2b, with a tangential flow rotor 3 which is not shown in detail but which is divided into a port rotor 3a and a starboard rotor 3b, driven by a common drive means. The aircraft has a fuselage comprising a pod 4 and a tail boom 5 which supports a tailplane 6 and a fin 7.

Figure 2:
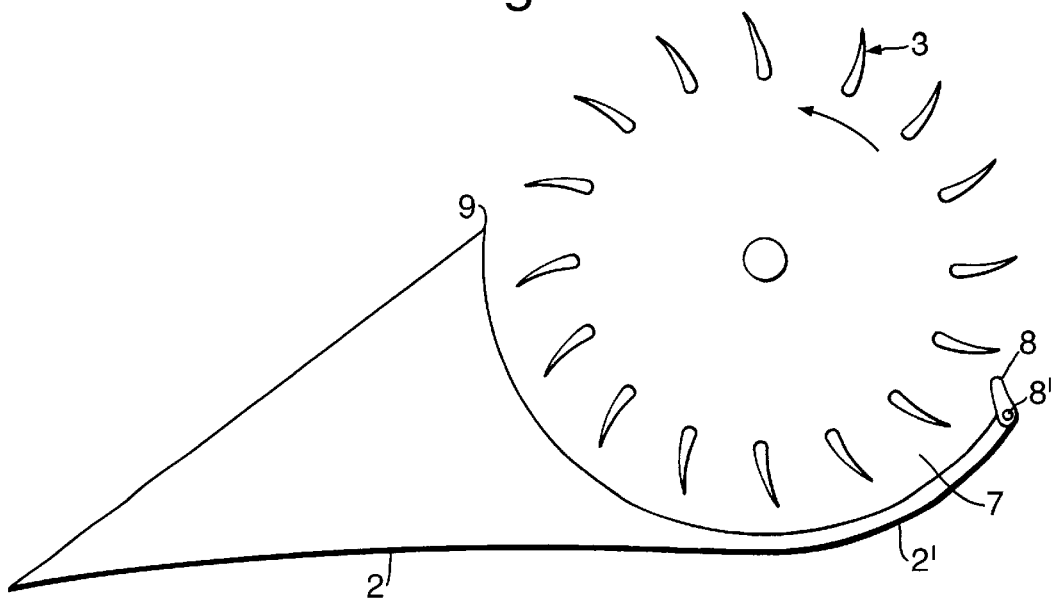
FIG. 2 is a side view of the wing of the aircraft in high lift configuration.

The underside of the wing body 2 is extended forwardly as a shroud 2' to enclose the cylindrical space 7 occupied by the rotor 3. At the leading edge of the shroud 6 is a pivotable lip-defining flap 8 which is shown in FIG. 2 as intruding on the cylindrical space 7 to its maximum extent. The flap 8 is mounted for pivoting about a pivot defining a pivot axis 8'.

In rotation of the rotor 3, in the anticlockwise sense as viewed in FIG. 2, the tangential flow in the rotor results in the air expelled from the exposed periphery of the rotor at the front and the top of the wing becoming divided by the nose 9 at the top of the wing-like body 2 such that the expelled air moves downwardly and rearwardly over the upper surface of the wing-like body 2 while the rest of the air moves in the anticlockwise sense within the cylindrical space 7 until it reaches the lip defined by the flap 8 in the FIG. 2 position. As a result an anticlockwise vortex is generated within the rotor and greatly improves the lift force, as described in my WO 98/07622.

Figure 3:
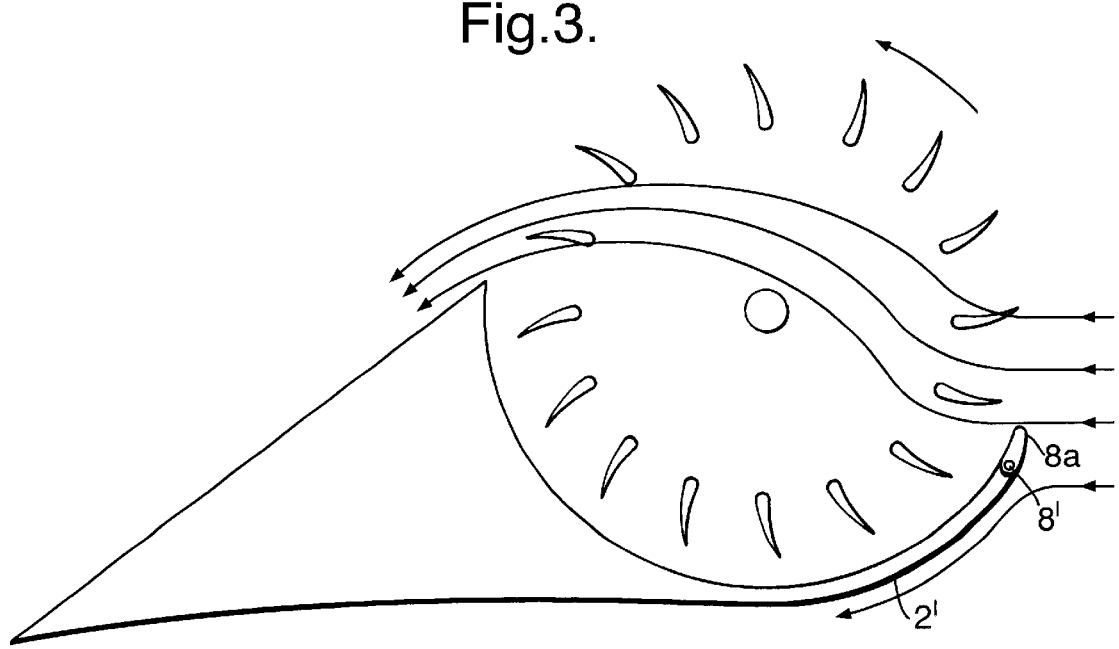
FIG. 3 is a side view of the wing of FIG. 2 in a cruising or normal lift-generating configuration.

It has been found that in the high lift configuration shown in FIG. 2 the noise generated by the wing and rotor combination is increased as compared with that which would normally be experienced in the cruising configuration shown in FIG. 3 where the flap 8 is in the position 8a substantially flush with the rest of the shroud 2'. In this FIG. 3 position less lift is generated and also less thrust is generated but, provided the flap is as close as possible to the periphery of the fan rotor, the efficiency of the wing is at a maximum. The induced air flow through the rotor in the FIG. 3 configuration is illustrated by the arrows moving along curved streamlines from right to left in the drawing. In the FIG. 2 (high lift) position the flap 8 is even closer to the passing rotor blades than in the FIG. 2 position but must not interfere mechanically with them.

The difference in lift and thrust can be used in the following manner in order to provide optimum flight conditions.

For running up the rotor as rapidly as possible on the ground, the rotor drive motor is accelerated while the flap is in the position 8a shown in FIG. 3, thereby minimising resistance to rotation of the rotor. When the rotor has been run up to a desired speed the flap may be moved into its position 8 shown in FIG. 2 and this results in an increase in lift, allowing the aircraft to take off. When the aircraft is stationary the vortex-controlling flap 8 is at its most effective. The aircraft may already have been accelerating forwardly while in the FIG. 3 configuration but generating much less lift, possibly only 20% of the available lift, than it does in the FIG. 2 position.

In flight, the flap is returned to the position 8a shown in FIG. 3, or to a position close to it, in order to minimize the rotational drag on the rotor, but also to take advantage of the induced lift resulting from the air flow through the rotor and the air flow over the aerofoil wing-like body 2. In order to control the angle of bank and/or the angle of yaw it is possible to vary the position of the flap to a position somewhere between the two extreme positions shown in FIG. 2 and FIG. 3.

In order to provide for optimum manoeuverability the aircraft may be flown during climb after take off or during approach to landing with the two flaps set midway between the extreme positions shown in FIGS. 2 and 3, such that when bank is needed it is possible to increase the lift from the steady state by increasing the degree of intrusion of the flap on the side where higher lift is required and decreasing the lift on the other wing by similarly reducing the degree of intrusion into the space 7.

For take off and landing it is advantageous for both wings simultaneously to be in the FIG. 2 configuration, or in a configuration close enough to it to generate high lift and high thrust but still leave some degree of differential adjustability for controlling bank and yaw on landing.

From the above it will be understood that the rotor 3 may initially tend to slow down somewhat during the take off phase, until the forward speed is such that the air flow through the rotor again assists in reducing the resistance to rotation of the rotor. Thus in the take off phase it is possible to some extent to build up excess rotor speed with the flap in the FIG. 3 position and then to consume some of that energy in the take off phase when the flap moves towards the FIG. 2 configuration and the resistance to rotation of the fan rotor 3 builds up.

The principle illustrated in FIGS. 2 and 3 can be readily applied to any of the wing cross-sections shown in WO 98/07622, and indeed to any other variations of the basic configuration of the rotor in the leading edge of the wing body.

If desired and inboard section of each wing (2a, 2b) may have its vortex-generating flap adjustable independently of that as the outboard section so that the inboard section may remain in the high lift configuration during take off and the landing approach, while the outboard section may be adjusted for manoeuvring.

Figure 4A:
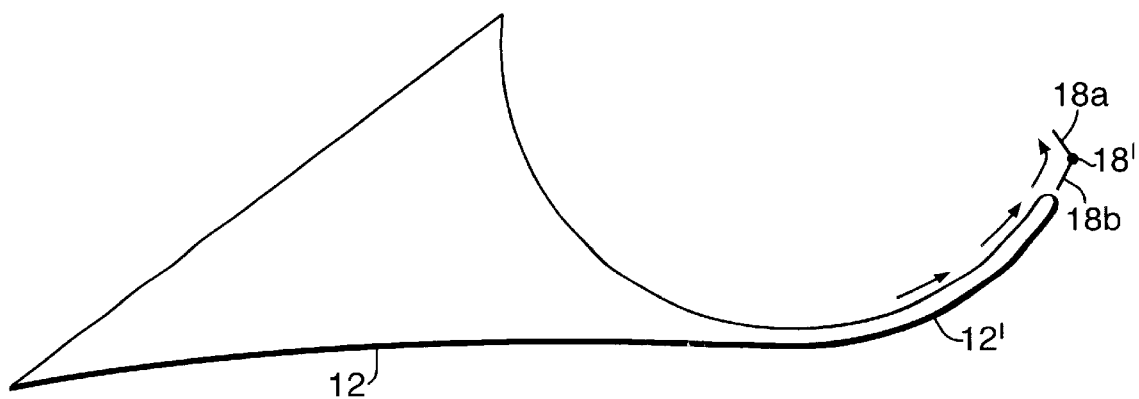
FIGS. 4a and 4b are vertical sectional views of a second embodiment, with the tangential flow fan rotor omitted.
Figure 4B:
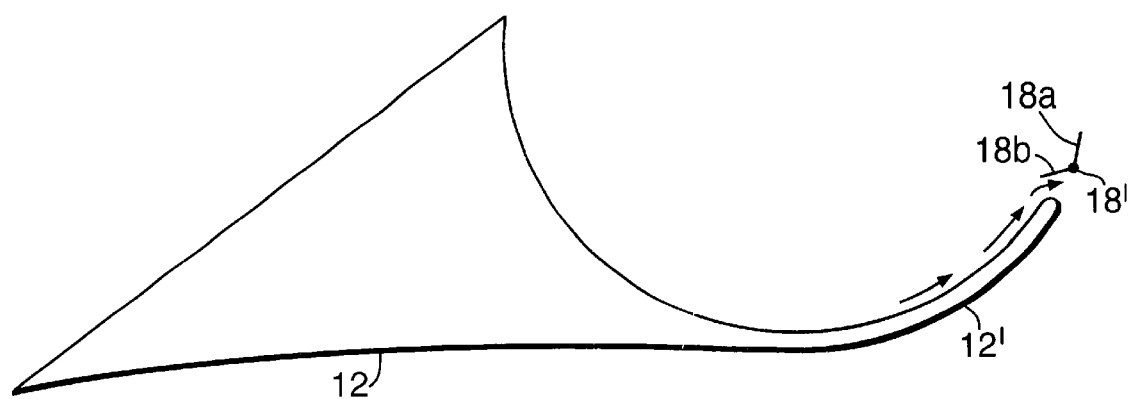

The embodiment shown in FIGS. 4a and 4b differs from that shown in FIGS. 2 and 3 in that there are two limbs 18a and 18b to the flap, pivotable about a single pivot axis 18'. The two limbs 18a and 18b are at a fixed angle of inclination relative to one another. In the FIG. 4a position the flap limb 18b is substantially a continuation of the shroud 12', while the flap limb 18a is directed inwardly towards the rotor in the position giving maximum lift and thrust (similar to the FIG. 2 configuration).

In the FIG. 4b configuration this two part flap has pivoted clockwise about the pivot 18' so as to (i) open a gap in the 'shroud' where the flap limb 18b has moved inwardly from it flush position, and (ii) to decrease the extent to which the upper flap limb 18a extends inwardly until it defines the front of the shroud 2'. In this configuration the high speed peripheral air moving forwardly along the inner surface of the shroud will spill out forwardly to reduce both lift and thrust still further as compared with the FIG. 3 configuration, thereby giving more control of differential thrust and lift to improve manoeuvrability of the aircraft.

Figure 5A:
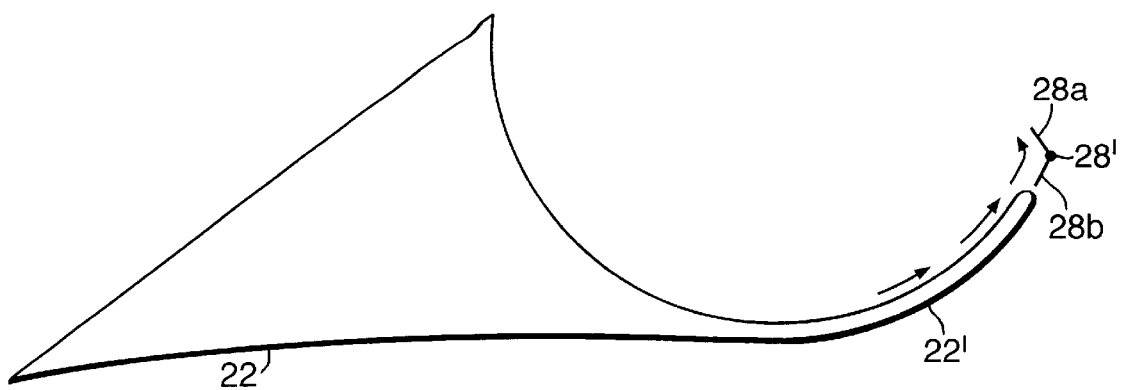
FIGS. 5a, 5b, and 5c are views similar to FIGS. 4a and 4b, but showing a third embodiment of the lift generating member of the invention.
Figure 5B:
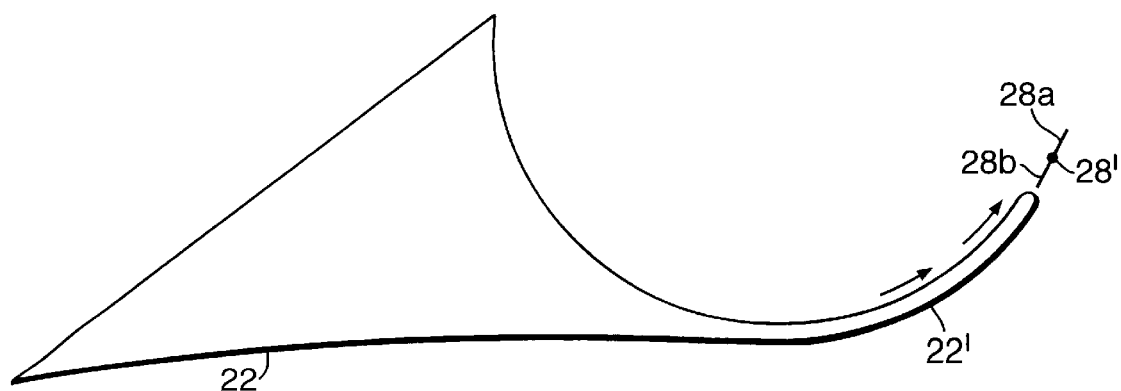
Figure 5C:
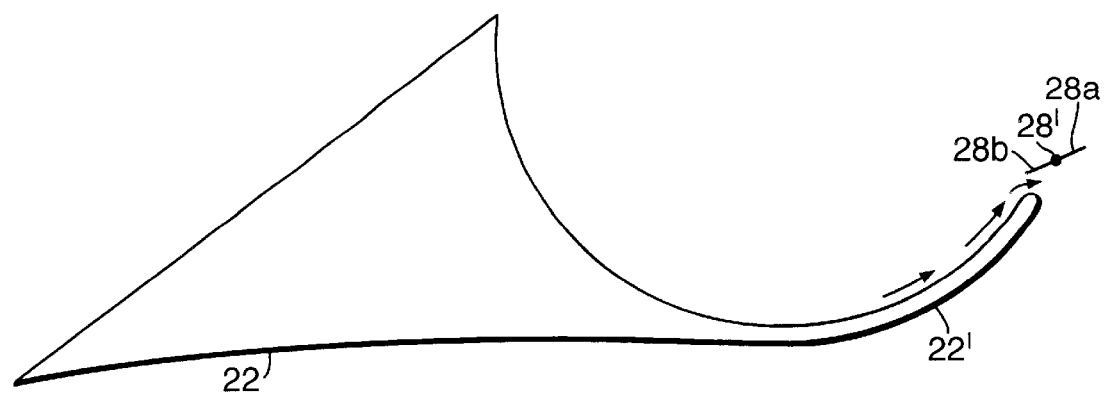

In the embodiment of FIGS. 5a, 5b, and 5c the control of this better manoeuvrability embodiment of FIGS. 4a and 4b is still further improved in that an additional facility is provided by virtue of the intermediate configuration of FIG. 5b.

In the embodiment of FIGS. 5a, 5b and 5c the two limbs 28a and 28b of the flap are to a degree pivotable independently of one another. If desired, complete independence may be provided. For movement from the FIG. 5a configuration to the FIG. 5b configuration the upper flap limb 28a pivots clockwise while the lower flap limb 28b is stationary, until the two limbs 28a and 28b are substantially mutually parallel in the FIG. 5b configuration and substantially flush with the shroud 2'. From then on the two limbs move in unison to reach the FIG. 5c configuration where the two limbs together define the spill passage to allow forward spilling out of the forwardly moving air between the fan rotor and the shroud.

I claim:

1. In a lift-generating member comprising:
    a wing-like body defining leading and trailing edges and first and second opposed surfaces which converge towards said trailing edge, said first surface being uppermost in flight;
    a shroud which extends forwardly and upwardly from said second surface adjacent said leading edge of the wing-like body;
    a spanwise extending tangential flow rotor having an axis of rotation and positioned adjacent the leading edge of the wing-like body and projecting proud of said first opposed surface, said second opposed surface being defined in part by said shroud which confines the space occupied by the tangential flow rotor and terminates at a lip to define a vortex within the rotor;
    the improvement wherein said lip is defined by movable flap means which is variable between a first position projecting away from the general direction of the shroud so as to intrude on the space occupied by the rotor and a second position in which it does not intrude to that same extent.

2. A lift-generating member according to claim 1, wherein said second position is such that said movable flap means is flush with the shroud.

3. A lift-generating member according to claim 1, wherein said shroud defines a cylindrical wall concentric with said axis of rotation of the rotor.

4. A lift-generating member according to claim 1, wherein said flap means is pivotally mounted relative to the front of said shroud.

5. A lift-generating member according to claim 4, wherein said flap means comprises first and second flaps, pivotable about a common pivot axis between a first position in which together they define a continuation of the shroud and a second position in which together they define ahead of the front of the shroud an air spillage passage for air travelling between the fan rotor and the shroud.

6. A lift-generating member according to claim 5, wherein the said first flap is movable independently of said second flap over at least part of its travel.

7. An aircraft including port and starboard wings each formed as a lift-generating member according to claim 1, and further including means for varying the position of said movable flap means on each wing.

8. An aircraft according to claim 7, wherein said flap position varying means is able to cause said flap means on the port wing to intrude on the space occupied by its rotor to an extent different from that to which the corresponding flap means on the starboard wing intrudes on the space occupied by its rotor.

* * * * *